United States Patent
Patel et al.

(10) Patent No.: US 8,266,704 B1
(45) Date of Patent: Sep. 11, 2012

(54) METHOD AND APPARATUS FOR SECURING SENSITIVE DATA FROM MISAPPROPRIATION BY MALICIOUS SOFTWARE

(75) Inventors: Meena Patel, Pune (IN); Basant Rajan, Pune (IN)

(73) Assignee: Symantec Corporation, Mountain View, CA (US)

( * ) Notice: Subject to any disclaimer, the term of this patent is extended or adjusted under 35 U.S.C. 154(b) by 479 days.

(21) Appl. No.: 12/241,369

(22) Filed: Sep. 30, 2008

(51) Int. Cl.
*H04L 29/06* (2006.01)

(52) U.S. Cl. .......................................................... 726/25

(58) Field of Classification Search ....................... 726/25
See application file for complete search history.

(56) References Cited

U.S. PATENT DOCUMENTS

| | | | |
|---|---|---|---|
| 6,757,830 B1 * | 6/2004 | Tarbotton et al. | 713/188 |
| 6,826,697 B1 * | 11/2004 | Moran | 726/23 |
| 2002/0138760 A1 * | 9/2002 | Naitoh | 713/201 |
| 2002/0199116 A1 * | 12/2002 | Hoene et al. | 713/201 |
| 2004/0098607 A1 * | 5/2004 | Alagna et al. | 713/200 |
| 2005/0137980 A1 * | 6/2005 | Bullock et al. | 705/44 |

* cited by examiner

*Primary Examiner* — Michael S McNally

(74) *Attorney, Agent, or Firm* — Wilmer Cutler Pickering Hale and Dorr LLP

(57) ABSTRACT

A method and apparatus for securing sensitive data from misappropriation by malicious software is provided. In one embodiment, the method for securing sensitive data from misappropriation by malicious software includes examining a history to identify potentially compromised sensitive data upon an occurrence of the malicious software and notifying a user regarding the potentially compromised sensitive data.

17 Claims, 2 Drawing Sheets

METHOD AND APPARATUS FOR SECURING SENSITIVE DATA FROM MISAPPROPRIATION BY MALICIOUS SOFTWARE

BACKGROUND

1. Field of the Invention

Embodiments of the present invention generally relate to detecting malicious software, and more particularly, to a method and apparatus for securing sensitive data from misappropriation by malicious software.

2. Description of the Related Art

Because of the development and progression of network accessible media content (e.g., videos, blogs, graphical images, news and/or the like), people have become more computer savvy and spend a significant amount of time browsing the Internet to communicate with other people (e.g., through instant messages and emails), conduct research (e.g., through educational websites, digital libraries and expert discussion forums), perform business applications (e.g., online securities trading and bank account management) and/or the like.

As Internet usage increases, proliferation of network-based threats across computer networks (e.g., malicious software, spyware, worms, rootkits and/or the like) also increases. Generally, malicious software is designed to exert control over and/or cause damage to the computer. For example, activities performed by the malicious software disrupt or degrade the performance of various computer resources, such as a processor, an operating system, a computer memory, a software application and/or the like. Furthermore, the malicious software compromises sensitive data (e.g., passwords, security question answers, credit cards, social security numbers and/or the like). For example, the malicious software misappropriates a password that is used to authenticate access to an online checking account.

Current anti-malicious software techniques utilize pre-determined definitions (e.g., code-based or activity-based signatures) to detect the malicious software on the computer. Such pre-determined definitions, however, do not include recent information for detecting and/or mitigating latest malicious software. As a result, the computer is infected and the sensitive data is compromised by the latest malicious software due to a lack of up to'date definitions.

Therefore, there is a need in the art for a method and apparatus for securing sensitive data from misappropriation by malicious software.

SUMMARY OF THE INVENTION

Embodiments of the present invention generally comprise a method and apparatus for securing sensitive data from misappropriation by malicious software. In one embodiment, the method for securing sensitive data from misappropriation by malicious software includes examining a history to identify potentially compromised sensitive data upon an occurrence of the malicious software and notifying a user regarding the potentially compromised sensitive data.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
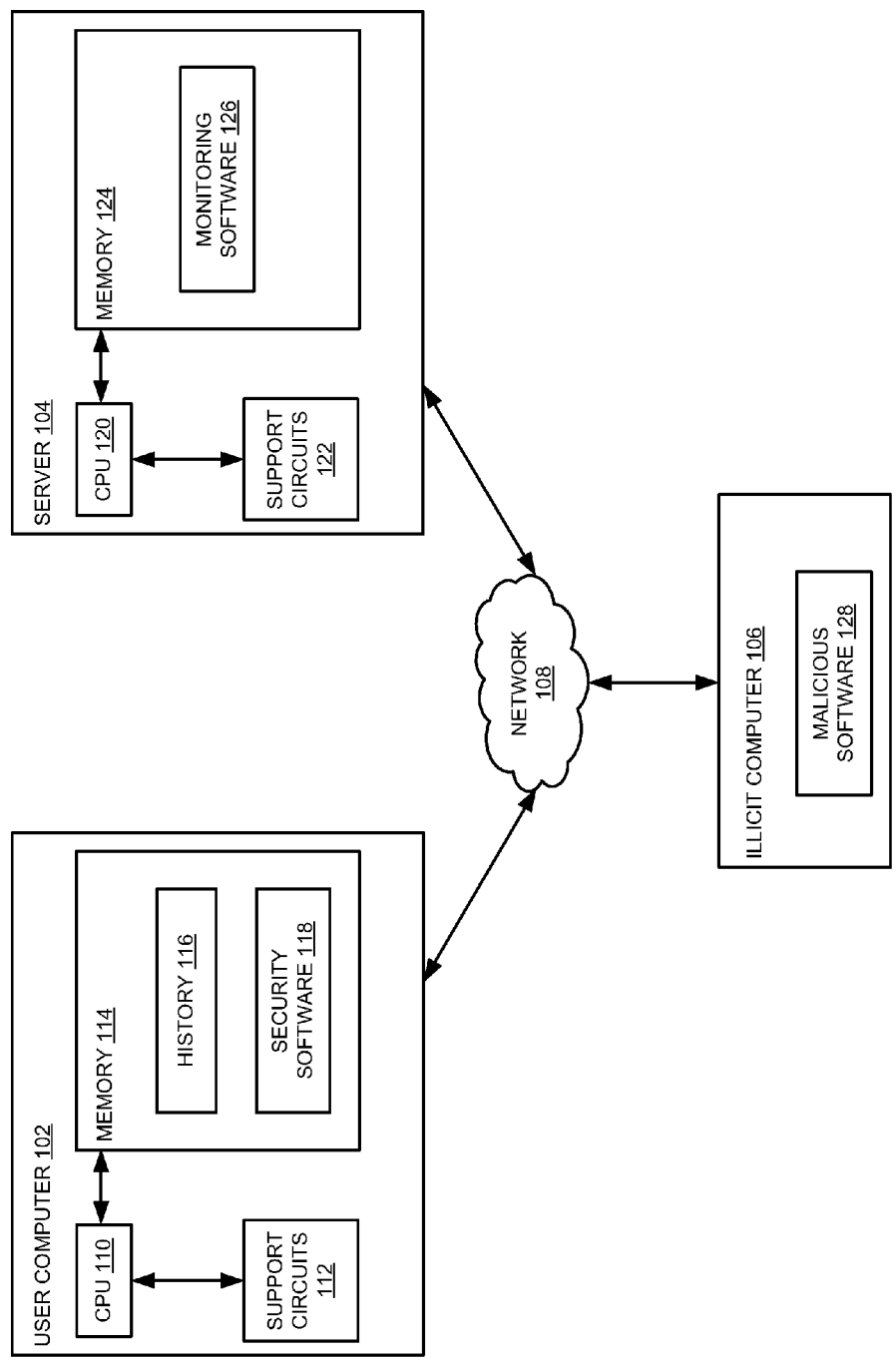
FIG. 1 is a block diagram of a system for securing sensitive data from a misappropriation by malicious software in accordance with one or more embodiments of the present invention.

FIG. 1 is a block diagram of a system 100 for securing sensitive data from misappropriation by malicious software according to one embodiment. The system 100 comprises a user computer 102, a server 104 and an illicit computer 106 where each is coupled to each other through a network 108.

The user computer 102 is a type of computing device (e.g., a laptop, a desktop, a Personal Digital Assistant (PDA) and/or the like), such as those generally known in the art. The user computer 102 includes a Central Processing Unit (CPU) 110, various support circuits 112, and a memory 114. The CPU 110 may comprise one or more commercially available microprocessors or microcontrollers that facilitate data processing and storage. The support circuits 112 facilitate the operation of the CPU 110 and include one or more clock circuits, power supplies, cache, input/output circuits, and the like. The memory 114 comprises at least one of Read Only Memory (ROM), Random Access Memory (RAM), disk drive storage, optical storage, removable storage, and the like. The memory includes various data, such as a history 116 and sensitive data 117. The memory 114 further includes various software packages such as security software 118.

The server 104 is a type of computing device (e.g., a laptop, a desktop, a Personal Digital Assistant (PDA) and/or the like), such as those generally known in the art. The server 104 includes a Central Processing Unit (CPU) 120, various support circuits 122, and a memory 124. The CPU 120 may comprise one or more commercially available microprocessors or microcontrollers that facilitate data processing and storage. The support circuits 122 facilitate the operation of the CPU 120 and include one or more clock circuits, power supplies, cache, input/output circuits, and the like. The memory 124 comprises at least one of Read Only Memory (ROM), Random Access Memory (RAM), disk drive storage, optical storage, removable storage, and the like. The memory 124 includes various software packages, such as monitoring software 126. Generally, the monitoring software 126 forms a portion of a security subscription service (e.g., SYMANTEC Norton subscription) that updates the security software 118 with definitions for the malicious software 128 (e.g., latest malicious software).

The network 108 comprises a communication system that connects computers by wire, cable, fiber optic and/or wireless link facilitated by various types of well-known network elements, such as hubs, switches, routers, and the like. The network 108 may employ various well-known protocols to communicate information amongst the network resources. For example, the network 108 may be a part of the internet or intranet using various communications infrastructure such as Ethernet, WiFi, WiMax, General Packet Radio Service (GPRS), and the like.

The illicit computer 106 is a type of computing device (e.g., a laptop, a desktop, a Personal Digital Assistant (PDA) and/or the like), such as those generally known in the art. The illicit computer 106 includes malicious software 128 (e.g., spyware, viruses, rootkit and/or the like). Generally, the illicit computer 106 may be utilized by a hacker with an intention to upload the malicious software 128 to the user computer 102 and compromise the sensitive data 117 (e.g., passwords, login names, credit cards and/or the like).

According to various embodiments of the present invention, the malicious software 128 includes software code that when executed, causes degradation and disruption to performance of the user computer 102. Once the malicious software 128 realizes control over the user computer 102, the malicious software 128 compromises one or more portions of the sensitive data 117, such as personal information or online credentials (e.g., a login name, a password, social security number, credit card number and the like).

According to various embodiments of the present invention, the history 116 stores information regarding login activity related to the user computer 102. In one embodiment, the history 116 includes a login name utilized by the user to access one or more online resources (e.g., fantasy baseball accounts, online checking accounts at commercial banking websites and/or the like). As explained further below, the security software 118 uses the history 116 to protect the user when the malicious software 128 is installed in the user computer 104 but the malicious software is not yet detected by the security software 118 because of missing definitions.

In one embodiment, the history 116 maintains records of one or more websites (e.g., a commercial websites, a social networking website, e-commerce websites and/or the like) previously accessed (i.e., visited) by the user during a time period. In one embodiment, the history 116 is maintained for a time period equal to an average time period for generating a definition (e.g., code-based signature) for any malicious software that is out in the wild (e.g., the Internet or any other large computer system). In one embodiment, the security software 118 records login activity for at least time T where time T may be the average time period required to generate a definition for new malicious software (e.g., a new virus). For example, the average time period to generate the definition may be provided by a security response team (e.g., SYMANTEC Response). When a scan is completed by the security software 118 (e.g., as part of a scheduled scan or due to a new definition being available) and the new malicious software is detected, report each and every login name in the history 116 to the user. Then, the security software 118 prompts the user to change the sensitive information (e.g. passwords) provided for each and every of these login names. Finally, the security software 118 removes the each and every login from the history 116. When the scan is completed by the security software and malicious software is not detected, discard each and every portion of the history 116 that are older than time T and retain one or more remaining login names (e.g., earlier than time T).

As an example and not as a limitation, the history 116 is a log file of one or more login sessions initiated between the user and one or more previously accessed websites. Accordingly, for each login session, the security software 118 updates the history 116 with various attributes (e.g., a login name, a name of the server, an Internet Protocol (IP) address, a domain name and the like) of the one or more websites previously accessed by the user of the user computer 102. For example, the security software 118 scans POST form data of a Hyper Text Transfer Protocol (HTTP) request to identify potentially compromised sensitive data that was used (e.g., to access a website) while the malicious software 128 was resident within the user computer but prior to the detection of the malicious software 128 by the security software 118 (i.e., after an update of definitions for the latest malicious software by the monitoring software 126). As another example, the security software 118 scans an INPUT form of password type in the HTTP request to identify the potentially compromised sensitive data (e.g., a password). Furthermore, the security software 118 extracts a domain name and an IP address from the HTTP request to update the history 116. As yet another example, the security software 118 scans a relevant command/response sequence for a File Transfer Protocol (FTP) session to identify the potentially compromised sensitive data.

In one or more embodiments, the security software 118 is designed to detect the malicious software 128 and mitigate any detrimental effect caused by execution of the malicious software 128. In one embodiment, the security software 118 scans the user computer 102 (e.g., scans local storage devices, computer memory and/or other computer resources) to detect the malicious software 128. The security software 118 may scan the user computer 102 after a fixed, pre-defined time interval or a variable time interval. Such a scan of the user computer 102 may determine an occurrence of the malicious software 128 in the user computer 102 (e.g., detect the malicious software 128 by activity-based signature). Upon such an occurrence, the security software 118 examines the history 116 to identify one or more potentially compromised portions of the sensitive data 117.

On detecting the malicious software 128, the security software 118 examines the history 116 and retrieves information associated with each login session associated with the user. Subsequently, the security software 118 notifies the user regarding one or more login sessions where sensitive data (e.g., online security credentials, personal information and/or the like) is potentially compromised due to operations performed by the malicious software 128. Furthermore, the security software 118 prompts the user to change the potentially compromised sensitive data.

As an example and not as a limitation, the illicit computer 106 uploads the malicious software 128 to the user computer 102. The security software 118 scans the user computer 102 for an occurrence of the malicious software 128 but is unable to detect the malicious software 128 due to a lack of recent definitions. After a time interval, the monitoring software 126 updates the security software with the recent definitions for the latest malicious software. As such, if a subsequent scan determines the occurrence of the malicious software 128 within the time interval between consecutive scan, then the security software 118 examines the history 116 to identify one or more potentially compromised portions of the sensitive data 117. In one embodiment, the security software 118 accesses and examines the history 116 to identify the potentially compromised sensitive data (e.g., login identification, a password, a social security number, a credit card number and the like). Moreover, the security software 118 may notify the user regarding the potentially compromised sensitive data and prompt the user to change the potentially compromised sensitive data in order to protect the user from sensitive data misappropriation, such as identity theft, fraud and/or the like.

Figure 2:
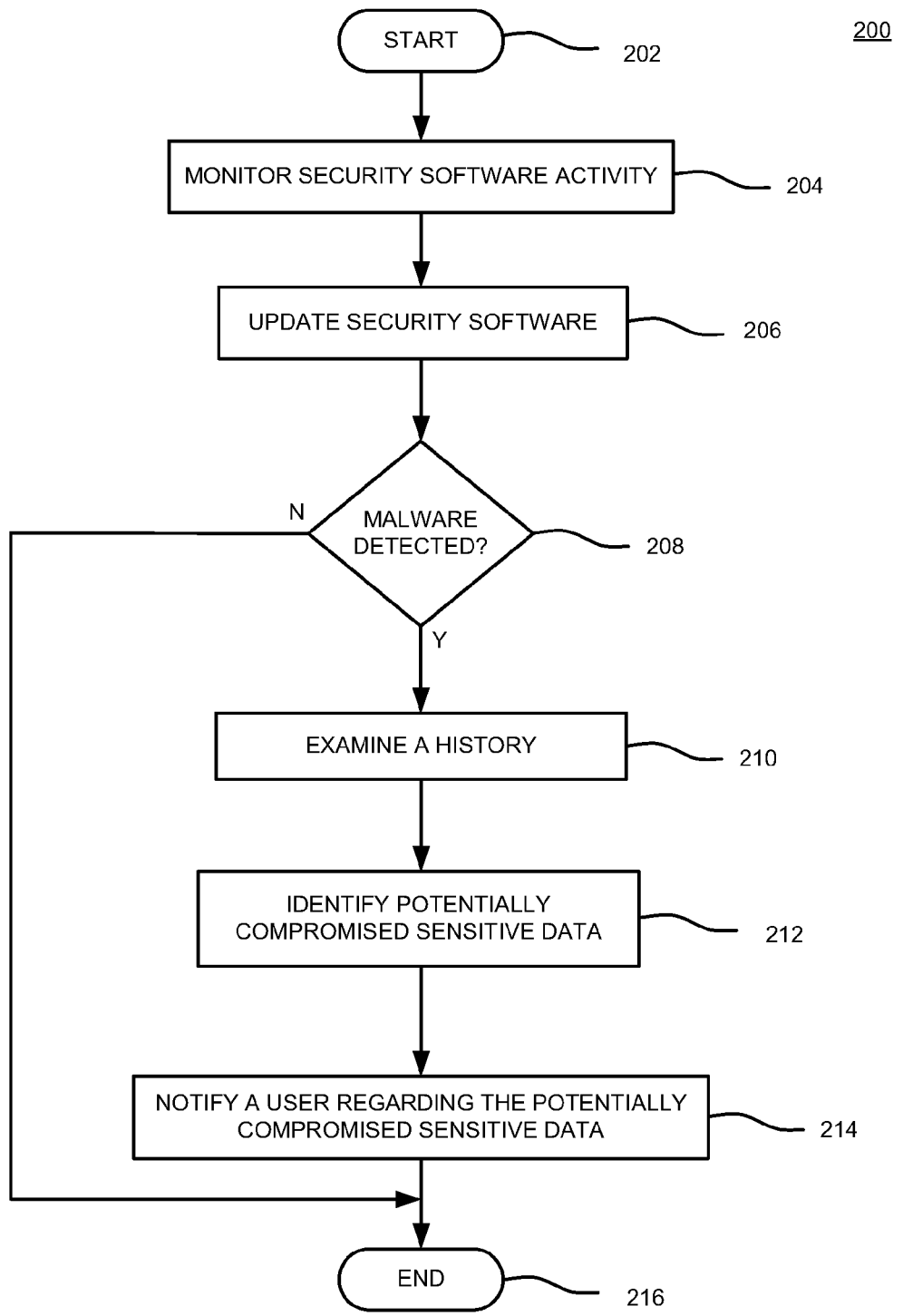
FIG. 2 is a flow diagram of a method for securing sensitive data from misappropriation by malicious software in accordance with one or more embodiments of the present invention.

FIG. 2 is a flow diagram of a method 200 for securing sensitive data from misappropriation by malicious software according to one or more embodiments of the present invention. The method 200 starts at step 202 and proceeds to step 204, at which security software (e.g., the security software 118 of FIG. 1) activity is monitored.

At step 206, the security software is updated. In one or more embodiments, the security software is updated with recent definitions for detecting the malicious software. At step 208, a determination is made as to whether the malicious software is detected (e.g., during a time interval between consecutive scans). If it is determined that the malicious software is detected (option "YES") then the method 200 proceeds to step 210. At step 210, a history (e.g., the history 116 of FIG. 1) is examined. At step 212, potentially compromised sensitive data is identified. At step 214, a user is notified regarding the potentially compromised sensitive data. In one embodiment, the user is requested to change the potentially compromised sensitive data. For example, the user may be prompted to change a login name and/or a password for accessing an online resource. The method 200 proceeds to step 216. If at step 208, it is determined that the malicious software is not detected (option "NO") then the method 200 proceeds to step 216, where the method 200 ends.

Thus, various embodiments of the present invention have been provided. The inventive methods and apparatus may advantageously secure sensitive data from malicious software. In one embodiment, the inventive apparatus advantageously minimizes the extent of damage caused by the malicious software.

While the foregoing is directed to embodiments of the present invention, other and further embodiments of the invention may be devised without departing from the basic scope thereof, and the scope thereof is determined by the claims that follow.

The invention claimed is:

1. A method for securing sensitive data from misappropriation by malicious software, comprising:
   updating a security software;
   examining, via at least one computer processor, a history of events occurring before the update by recording login activity for a time period to identify potentially compromised sensitive data upon an occurrence of the malicious software, wherein the time period is equal to or greater than an average time period for generating a definition for the malicious software; and
   notifying a user regarding the potentially compromised sensitive data.

2. The method of claim 1, wherein examining the history further comprises scanning a user computer to determine an occurrence of the malicious software at a user computer.

3. The method of claim 2, wherein scanning the user computer further comprises scanning the user computer after at least one of a fixed time interval or a variable time interval.

4. The method of claim 2, wherein scanning the user computer comprises scanning the user computer after an update of at least one definition for determining the occurrence of the malicious software at the user computer.

5. The method of claim 1, wherein the potentially compromised sensitive data comprises a password.

6. The method of claim 1, wherein the history comprises information regarding at least one login session between the user and at least one online resource.

7. The method of claim 6, wherein the history further comprises sensitive data that is used to authenticate access for each online resource of the at least one online resource.

8. The method of claim 1, wherein notifying the user regarding the potentially compromised sensitive data comprises prompting the user to change the potentially compromised sensitive data.

9. The method of claim 6 further comprising prompting the user to change a password used to access an online resource prior to the determination of the occurrence of the malicious software.

10. An apparatus for securing sensitive data from misappropriation by malicious software, comprising:
    at least one computer processor configured to:
       determine an occurrence of malicious software;
       examine a history of events occurring before a previous software update by recording login activity for a time period to identify potentially compromised sensitive data, wherein the time period is equal to or greater than an average time period for generating a definition for the malicious software; and
    notify a user regarding the potentially compromised sensitive data; and at least one memory, coupled to the at least one computer processor, configured to provide the at least one processor with instructions.

11. The apparatus of claim 10, further comprising security software configured to scan the user computer after at least one of a fixed time interval or a variable time interval.

12. The apparatus of claim 10, further comprising security software configured to scan the user computer after an update of at least one definition for determining the occurrence of the malicious software at the user computer.

13. The apparatus of claim 10, wherein the history comprises information regarding at least one login session between the user and at least one online resource.

14. The apparatus of claim 10, further comprising security software configured to prompt the user to change the potentially compromised sensitive data.

15. A system for securing sensitive data from misappropriation by malicious software, comprising:
    a user computer, comprising:
       a memory comprising a history of events occurring before a previous software update for information regarding at least one login session between a user and at least one online resource;
       security software for scanning the user computer to determine an occurrence of the malicious software, examining the history by recording login activity for a time period to identify potentially compromised sensitive data and notifying the user regarding the potentially compromised sensitive data, wherein the time period is equal to or greater than an average time period for generating a definition for the malicious software; and
    a server, comprising:
       monitoring software for updating the security software with at least one recent definition for determining the occurrence of the malicious software.

16. The system of claim 15, wherein the security software prompts the user to change the potentially compromised sensitive data.

17. The system of claim 15, wherein at least one of the events comprises a login session between a user and at least one online resource.

* * * * *